United States Patent [19]

Pilz

[11] 4,109,432

[45] Aug. 29, 1978

[54] MULTIPANE INSULATING GLASS PROCESS AND RIM STRIP

[76] Inventor: Reiner Pilz, Hohenbachernstr. 4, 8051 Kranzberg, Fed. Rep. of Germany

[21] Appl. No.: 648,667

[22] Filed: Jan. 13, 1976

[30] Foreign Application Priority Data

Jan. 13, 1975 [DE] Fed. Rep. of Germany ....... 2501096

[51] Int. Cl.² .......................... B32B 1/04; E04B 2/28; E06B 3/64
[52] U.S. Cl. ........................................ 52/172; 52/788; 156/109; 428/34
[58] Field of Search ................. 52/172, 203, 616, 398, 52/399; 428/34, 81, 122; 156/109

[56] References Cited

U.S. PATENT DOCUMENTS

| 2,340,469 | 2/1944 | Hall | 52/398 X |
|---|---|---|---|
| 3,068,136 | 12/1962 | Reid | 156/109 X |
| 3,832,254 | 8/1974 | Bowser et al. | 52/172 X |
| 3,914,482 | 10/1975 | Sawa et al. | 52/716 X |
| 3,919,023 | 11/1975 | Bowser et al. | 52/172 X |
| 3,928,953 | 12/1975 | Mazzoni et al. | 52/172 |

FOREIGN PATENT DOCUMENTS

| 552,489 | 2/1958 | Canada | 52/172 |
|---|---|---|---|
| 747,173 | 11/1966 | Canada | 52/203 |
| 1,226,536 | 3/1971 | United Kingdom | 52/399 |
| 1,227,943 | 4/1971 | United Kingdom | 52/397 |

*Primary Examiner*—Alfred C. Perham
*Attorney, Agent, or Firm*—Prutzman, Hayes, Kalb & Chilton

[57] ABSTRACT

Several embodiments of an extruded plastic rim strip for holding the panes of a double pane insulating glass in spaced parallel relationship and having a chamber with a moisture absorbent material intermediate the panes and a surface layer of adhesive extruded therewith for securing the rim strip to the panes and provide a seal therebetween.

13 Claims, 5 Drawing Figures

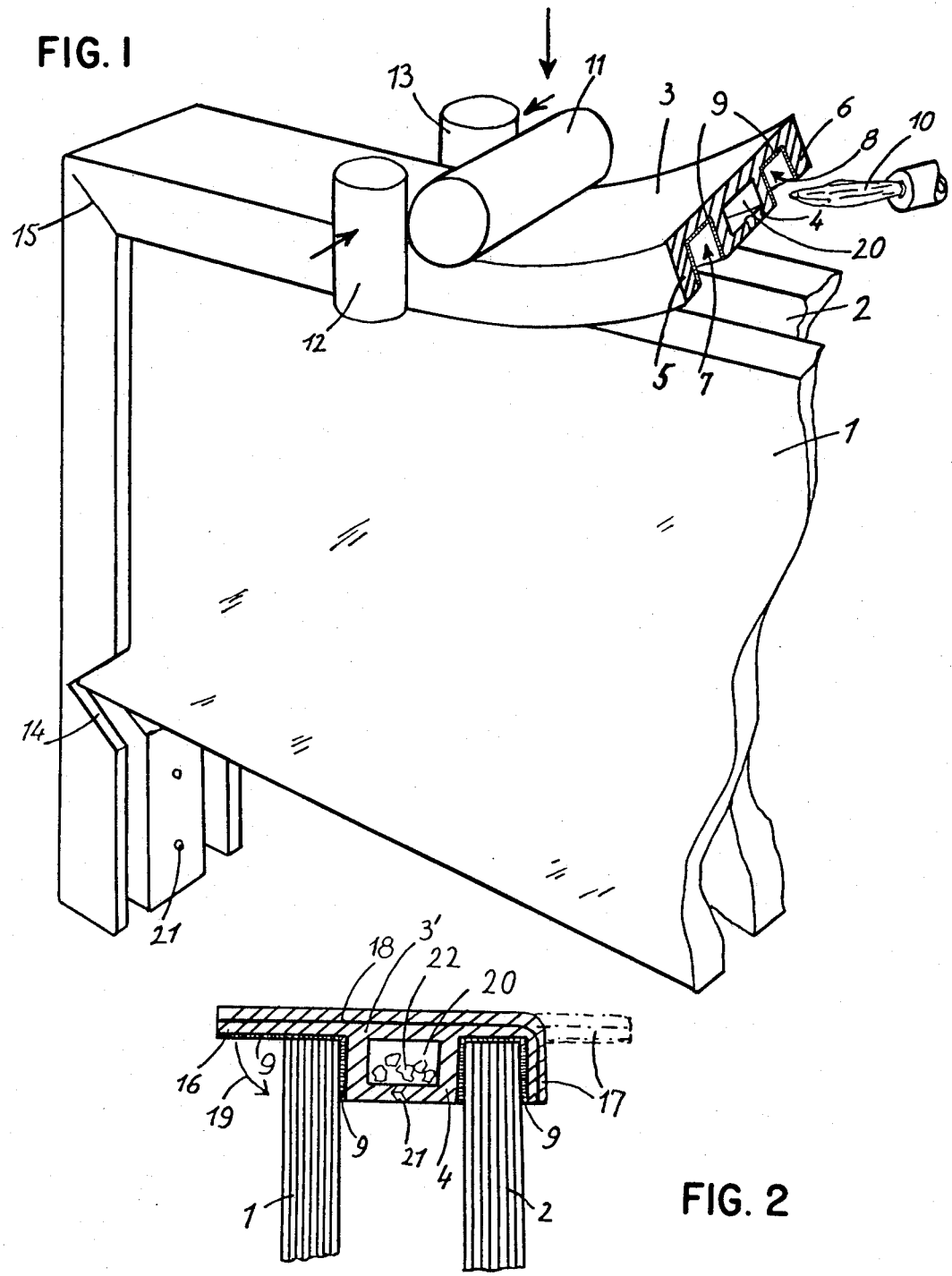

MULTIPANE INSULATING GLASS PROCESS AND RIM STRIP

BACKGROUND OF THE INVENTION

Double or multiple panes of insulating glass are being used to an ever increasing extent in high-rise construction because of their heat insulating characteristics. For its production, however, hitherto relatively complicated and expensive processes were necessary. The reason for this is that high demands are made of the frame connecting the panes. It must be absolutely tight against moisture and it must not lose this characteristic even after decades of use under the usual weather dependent temperature conditions. In practice only such thermal panes have proven themselves essentially in the case of which the surrounding rim strip consists of lead and is connected with the glass panes by a cementing or sealing mass. Furthermore, insulating double panes have been known in the case of which the edges of the glass panes running in parallel at a distance from one another are directly fused together. Both processes require expensive production arrangements at the place of fabrication which can be equipped only for a limited number of different formats of panes moreover for reasons of rationalization.

So far no one succeeded in creating double pane insulating glass with a frame made of plastic because hiterto it had not been possible to produce a faultless sealing connection between the glass and the plastic by gluing or some other means.

BRIEF SUMMARY OF THE INVENTION

It is the task of the invention to create a double or multipane insulating glass which would satisfy the requirements of the practice which can be produced with considerably more simple means than hitherto. Furthermore, the invention provides for the creation of a rim strip to be stored in quantities, with which one can produce at any time and as desired double pane insulating glass by a simple gluing of the panes to the rim.

For the solution of this task, the invention provides a multipane insulating glass with a rim strip holding the two or more panes at a distance, which strip is glued to the panes by means of a layer of adhesive in a sealing manner and which is characterized by the fact that the rim strip consists of an extruded plastic profile and a layer of adhesive and wherein the layer of plastic is extruded with the plastic profile and as a result anchored to it and the layer of plastic has melting or contact adhesion characteristics.

It has been known for a long time that by common extrusion of plastics of variable characteristics one can produce combined plastic profiles, the profile parts, though having variable material characteristics, nevertheless adhere together in one piece and become inseparable. Even adhesive layers anchored in plastic material can be applied in this manner, especially by applying during hot extrusion of the plastic profile at the place of extrusion under high pressure of for example 150 atmospheres (atu), a plastic suitable as a hot sealable or contact glue onto the outside surfaces of the just extruded plastic profile. In this manner, for example covering strips and strips of veneer are produced for the furniture industry. By the common extrusion one will obtain an inseparable connection between the plastic and the adhesive layer as would not be accomplished by the actual gluing process.

The present invention makes use of this process by using a plastic strip which is provided during extrusion with an adhesive layer suitable for gluing the extruded plastic strip together with glass. As a result, an absolutely tight and durable connection between the adhesive layer and the plastic material of the rim strip will be achieved, so that in the case of the actual production of the thermal panes, one must merely take care there is sufficient adhesion and gluing together of the adhesive layer with the glass panes. Furthermore, important advantages from the point of view of production technique will result, since in the case of production of the thermal glass, it will not be necessary to handle a liquid or pasty mass of adhesive and to take care of its insertion at the proper places. The production can take place in the most simple manner by contact pressure of the plastic strip against the glass panes, especially by heating the adhesive layer at that time and by first heating it to a melting temperature.

Preferably the rim strip has grooves which encompass the edges of the glass panes that are to be sealed on three sides and which are provided with the advance coating of the adhesive at their inside surfaces. A preferred cross sectional profile of the rim strip has a middle bridge holding the panes at a distance and two right angle legs on both sides of the middle bridge. The legs are either formed at right angles so that an E-shaped profile results, or they proceed in a straight line and are bent only upon attachment of the rim strip to the outside of the glass panes under plastic deformation. The latter has the advantage that panes of various thickness can be processed with the same rim strip.

Preferably, a blocking layer made of a steam diffusion resistant material, expecially of aluminum foil, has been provided on the rim strip. Other materials too, such as copper foil, foil made of noble metal, steam resistant plastic foil come into question as blocking layers. The blocking layer can be embedded into the plastic profile of the rim strip even during extrusion. This will result in the advantage that the material strength of the plastic profile of the rim strip can be relatively low and, nevertheless, a sufficient steam diffusion blocking effect does exist. Without such an additional blocking layer and in the case of the customary plastic materials, such as PVC, material thicknesses of at least 7 to 10 mm would be required in order to guarantee the necessary sealing against moisture.

At the corners of the insulating pane, the rim strip can be guided around in one piece whereby in this case, it is miter cut and the cutting surfaces are welded or glued together by plastic welding.

The process according to the invention for the production of the thermal glass consists in pressing to the edges or edge areas of the glass panes held at a distance from one another, a rim strip made of plastic and provided with an adhesive layer that had been extruded onto it and by bringing the adhesive layer to an adhesively active state during or shortly prior to the contact pressure. For example, the adhesive layer can be a contact adhesive which is covered up with a protective foil which is pulled off just before pressing it on. Preferably, the adhesive layer is a hot sealable glue, which briefly prior to or during the pressing on is heated to melting temperature. Heating and pressing on can be accomplished with very simple means and above all continuously along the rim strip, so that the corresponding tools or machines can be small and simple and do not have to be adapted to a certain format of the glass panes. Thus, the production will be so simple that such insulating glass panes can be produced directly even by smaller processing plants and their production is not tied to the place of manufacturing of the glass.

The heating of the hot sealable glue prior to pressing on can take place by means of a jet of hot air or a flame, or else also by supersonic action. The latter has the advantage of a particularly simple and precise local and temporal control of the heat action and of a very quick cooling. The glass can also be preheated to about 50° to 100° C, which will improve the connection.

According to the invention, it is also possible to transform single glass panes already inserted into a customary window or door frame subsequently into a double pane insulating glass by equipping one pane with somewhat smaller dimension at its edges with the put on plastic rim strip and by then gluing said strip to the already inserted pane. One step in the process which makes the customary production of an insulating glass pane difficult is the insertion of moisture absorbing material into the space between the glass panes. This separate step in the process can be omitted according to the invention whenever a plastic rim strip is used, which has hollow spaces in which a moisture absorbing material has been disposed in advance. Especially this material can already be inserted during extrusion of the plastic strip into a channel which is continuous in the longitudinal direction of the strip. It has been known that moisture absorbing materials, such as silica gel or molecular sieves can be bound by suitable plastic additions in a state capable of extrusion. The hollow spaces filled with the moisture absorbing material can be connected with the interspace of the pane by suitable apertures. These apertures are produced preferably only just before the processing of the plastic strip, or else they are covered up until that time with a foil, so that the moisture absorbing characteristic will be preserved.

Other objects will be in part obvious and in part pointed out more in detail hereinafter.

A better understanding of the invention will be obtained from the following detailed description and the accompanying drawings of an illustrative application of the invention.

BRIEF DESCRIPTION OF THE DRAWINGS

The invention will be explained in more detail on the basis of the drawings.

FIG. 1 shows in a simplified perspective view the production of a double pane insulating glass (i.e., thermal glass) with an embodiment of a plastic rim strip or frame of the present invention;

FIG. 2 is an enlarged transverse section view showing another embodiment of the rim strip;

DESCRIPTION OF THE PREFERRED EMBODIMENTS

Figures 3, 4:
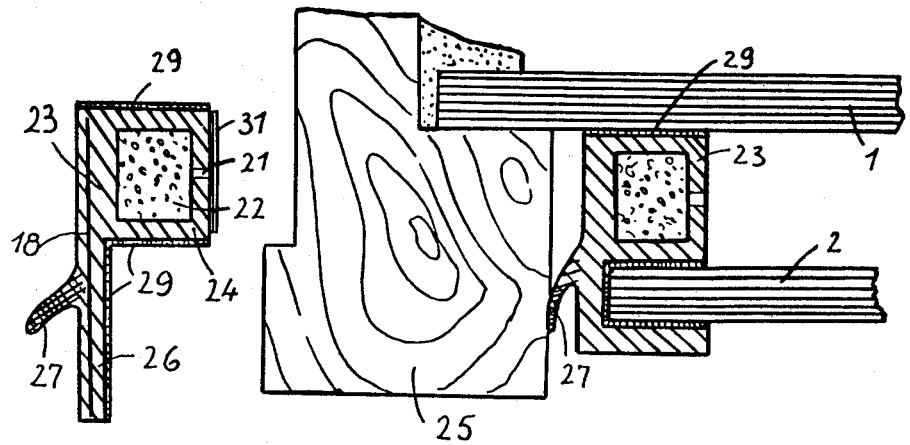
FIG. 3 is an enlarged transverse section view showing a further embodiment of the rim strip.
FIG. 4 is an enlarged transverse section view showing a double pane insulating glass produced with the embodiment of the rim strip or frame of FIG. 3.

According to FIG. 1, an insulating glass is produced by keeping two glass panes 1, 2 at a distance and by gluing a rim strip or frame 3 right around onto their rims. This rim strip 3 is extruded of plastic in such a way that it has an E-shaped profile with a center bridge 4 and two outside legs 5, 6 so that two grooves 7, 8 are formed for the reception of the edges of the glass panes 1, 2. The inside surfaces of the grooves 7, 8 are provided with a layer 9 made of a plastic which melts upon heating, for example to 80°-200° C and which acts as a hot sealable glue. The application of this layer of hot sealable glue takes place during the extrusion of the plastic strip 3 by applying the mass of hot sealable glue directly through lateral apertures in the extrusion nozzle while hot and under a high pressure between 100 and 200 atmospheres (atu), preferably 150 atmospheres (atu), onto the corresponding surfaces of the freshly extruded plastic strip 3. This will result in a thorough connection and anchoring of the mass of hot sealable glue to the plastic material. The result is a finished plastic strip coated with a hot sealable glue which is capable of unlimited storage and merely needs to be heated in order to be glued to the glass panes.

Starting from one end, the rim strip 3 can be glued to the rims of the glass panes 1, 2 continuously by heating it on the inside surfaces of the grooves 7, 8, for example by means of a flame 10 or preferably by means of a directed supersonic action and then by pressing it with suitable means, for example rollers, against the rim surfaces and the lateral surfaces of the glass panes as indicated by arrows. These rollers and possibly also the heating arrangement can be combined in a simple tool which can be moved along the edges of the panes. Furthermore, it is also possible to preheat the edges of the glass panes 1, 2.

The rim strip 3 preferably consists of a weldable plastic which is also deformable by heat. A suitable plastic is, for example sold under the name Levapren, modified PVC or some other thermoplastic plastic, the hardness of which is adjusted to correspond to the loads that are to be applied to the glass panes. At the corners of the glass panes 1, 2, the rim strip or frame 3 can be miter cut (as shown at 14), can be softened by heating and can be bent, whereupon the surfaces of the cuts are then welded together (as at 15). Also, in similar manner, the ends of the rim strips (not shown) are suitably cut to closely abut and are then welded together.

In the case of the use of heat deformable plastic, the rim strip can also have a shape as shown in FIG. 2, and as designated by 3'. In this case, straight line legs 16, 17 are formed at right angles to both sides of the center bridge 4, and the legs are made deformable through heating during attachment to the glass panes and are then bent in correspondence wiith the arrow 19 at right angles and are molded on and glued to the exterior sides of the glass panes 1, 2.

In the case of this embodiment, an aluminum foil 18 is embedded into the extruded plastic profile 3', which foil acts as a steam diffusion locking layer. In this manner, it is possible to achieve an absolutely moisture and steam-proof sealing of the insulating panes, without requiring the plastic material of the plastic profile 3' to be correspondingly thick. While standard or customary plastic material is sufficiently steam diffusion-proof only where the thickness is more than 7 to 10 mm, by using a locking layer 18 one can work with thicknesses of only 3 to 5 mm of the plastic profile 3'. Instead of an aluminum foil, it is also possible to use other metal foils or steam-proof, special plastic foils. The foil 18 is embedded in the profile 3' during extrusion.

In the case of the embodiments shown, a continuous hollow space or several suitably spaced hollow spaces 20 are provided along the center bridge 4 of the rim strip 3 or 3', which hollow spaces 20 are connected by means of small holes or channels 21 with the space between the glass panes 1, 2. A moisture absorbing material, for example silica gel or a molecular sieve, can be inserted into the hollow spaces 20 during the production of the rim strip 3 and which can then be used to attract and absorb the moisture between the glass panes through the channels 21 so that the glass panes remain free of steaming or clouding. The moisture absorbing material 22 can be available for example in a granular shape, whereby the material will be prevented from dropping through the correspondingly narrow and/or angularly designed holes 21. The movement of the material 22 in a longitudinal direction within the hollow space 20 can be prevented by suitable longitudinally spaced transverse walls or constrictions which can be produced easily in the warm state of the profile.

FIG. 3 shows an embodiment of a rim strip 23 in which a leg 26 extends from only one side from the middle bridge 24 provided for maintaining distance between the panes. An adhesive coating 29 applied during the extrusion of the plastic profile is provided along the lateral surfaces of the center bridge 24 and on the adjoining surface of the leg 26. An aluminum foil 18 has been embedded as a steam lock into the plastic profile. Furthermore, an elastic sealing flap 27 has been formed during the extrusin process on the one piece plastic profile. The area of the plastic profile forming the flap 27 indicated by cross hatching consists of a material of lesser Shore-hardness. A continuous hollow space 20 in the plastic profile 23 is filled with the moisture absorbing materia 22. Preferably, the absorbing material 22 is inserted during the extrusion of the plastic profile. For this purpose, a commercially obtainable moisture absorbing material bound by means of suitable plastic components to a shape that can be extruded is used. In this shape, it can be injected through the extruding nozzle into the hollow space 20 and so that it will fill said space almost completely. The material 22 constitutes a porous structure into which an moisture can be absorbed through the holes 21. During non-use of the plastic profile 23, the holes 21 are suitably covered with a moisture-proof cover foil 31 that can be pealed off easily.

Also, such a moisture absorbing material inserted by extrusion and such a cover foil 31 can be used in the case of the embodiments according to FIGS. 1 and 2.

With the plastic strip according to FIG. 3, it is possible to convert a one pane window inserted into a conventional frame subsequently into a double pane insulating window (thermal pane) as shown in FIG. 4. The pane 1 is inserted into a conventional frame 25 made for example of wood. In order to make a double pane window, a plastic strip is attached by heating the layer 29 of hot sealable glue onto another glass pane 2 at the edge, whereby the leg 26 is plastically deformed and bent against the glass pane 2. After that, the pane 2 can be glued with the plastic strip 23 to the pane 1, likewise through heating the adhesive layer 29. The flap 27 fits sealingly against the frame 25. The cover foil 31 is removed prior to gluing the panes 1 and 2 together.

Figure 5:
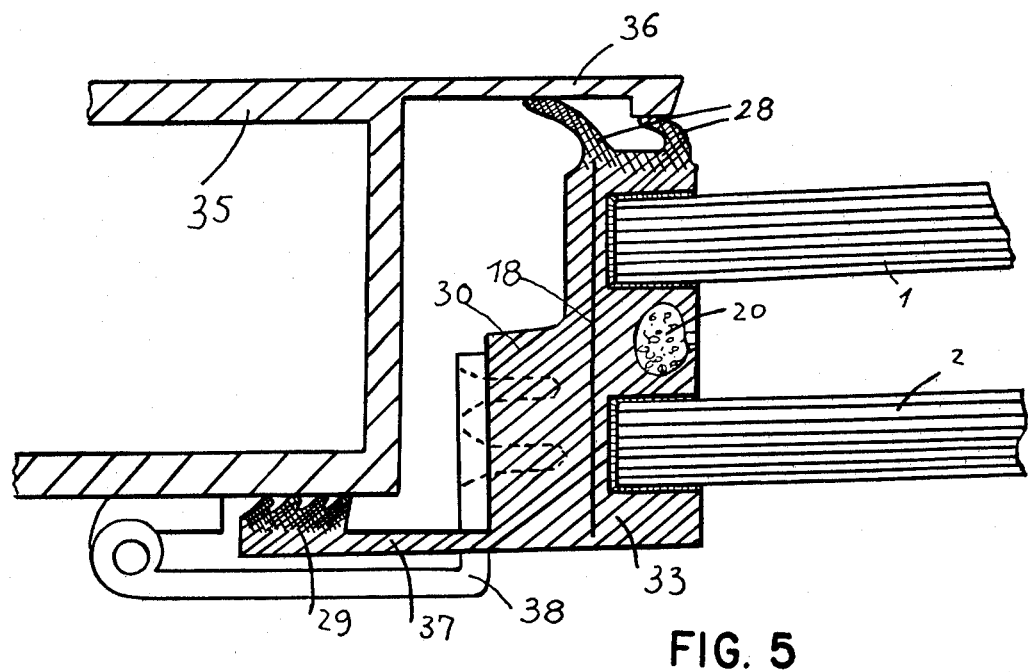
FIG. 5 is an enlarged transverse section view showing a still further embodiment of a double pane insulating glass rim strip according to the present invention.

FIG. 5 shows a plastic profile 33, similar to the embodiment according to FIG. 2, which connects two glass panes 1, 2 into a double glass insulating pane (thermal pane). A hollow space 20 filled with moisture absorbing material and an embedded steam diffusion lock 18 are likewise provided. In the case of this embodiment, additional sealing, attaching and framing parts are provided on the plastic profile extrusion 33, and whereby the additional parts provide a complete window sash out of the plastic frame 23 and with the sash providing a cooperating seal with a fixed window or door frame 35 made of wood or metal. In the case of this embodiment, there are provided in detail outside sealing lips 28 for cooperation with an outside stop flange 36 of the frame 35 as well as an inside cover flange 37 with sealing ribs 29, which fit against the inside of the frame 35. The sealing parts 28 and 29, as indicated by the cross hatch section, are made of softer material than the plastic profile 33. Furthermore, a reinforced area 30 of the profile has been provided to which attaching parts, for example a hinge strip 38, can be screwed to for attachment of the window sash to the frame 35.

Since it is possible to produce by extrusion many different cross sectional shapes of the plastic profile 33, it will be easily possible for the man skilled in the art to select the cross sectional shape for each case of application in such a way, that the profile 33 can assume as much as possible the appearance and function of a window sash.

Developments and modifications of the embodiments shown are quite easily possible within the scope of the invention. Especially it will be possible to combine three or more panes into one insulating glass pane instead of two glass panes. Also, the plastic rim strip can be provided with a cold contact adhesive, although a hot sealable glue is preferred. The holes 21 leading to the hollow space 20 filled with moisture absorbing material, can be provided when the rim strip is constructed and then covered with a suitable foil until processing, as described, or the holes 21 can be formed just before processing with a suitable punching device.

As will be apparent to persons skilled in the art, various modifications, adaptations and varations of the foregoing specific disclosure can be made without departing from the teachings of the present invention.

I claim:

1. In a multipane insulating glass having at least two panes and a composite rim strip holding the panes in spaced generally parallel relationship and sealingly overlying the edges of the panes and having a diffusion impermeable metallic layer and an adhesive layer adhering the composite rim strip to the space generally parallel panes, the improvement wherein the composite rim strip comprises an extruded plastic untiary structural body having a transverse profile for structurally holding the panes in said spaced generally parallel relationship wherein said diffusion impermeable metallic layer is embedded in and surrounded by said structural body and wherein said adhesive layer comprises a heat melting adhesive anchored to the plastic profile by being pressure extruded jointly therewith.

2. A multipane insulating glass according to claim 1 wherein the rim strip body has grooves which enclose the edges of the glass panes on three sides, and wherein the inside surfaces of the grooves are provided with the adhesive layer.

3. A multipane insulating glass according to claim 1 wherein the rim strip body has a generaly E-shaped transverse profile with a central bridge holding the two panes laterally spaced and two legs fitting against the outside faces of the two glass panes.

4. A multipane insulating glass according to claim 1 wherein at least one hollow space is provided in the rim strip body and connected with the interspace between the glass panes by apertures developed in the rim strip body, and wherein a moisture absorbing material is provided in the hollow space.

5. A multipane insulating glass according to claim 1 wherein the rim strip body encircles the corners of the glass panes in one piece and is miter cut at the corners and welded or glued to the surfaces of the cuts.

6. In a rim strip for a multipane insulating glass for holding at least two glass panes in spaced generally parallel relationship, the improvement wherein the rim strip comprises an extruded plastic unitary structural body having a transverse profile for structurally holding the panes in said spaced generally parallel relationship and with surfaces thereon adapted for being fitted against the glass panes, an anchored adhesive layer extruded jointly with the plastic body under high pressures for adhesively securing the plastic body to the glass panes, and a locking layer of steam diffusion resistant material embedded in the extruded plastic body.

7. A method for making multipane insulating glass having at least two glass panes, an elongated composite rim strip holding the panes in spaced generally parallel relationship and sealingly overlying the edges of the panes and having a diffusion impermeable metallic layer and an adhesive layer for adhering the composite rim strip to the panes, the composite rim strip comprising an extruded plastic unitary structural body having a transverse profile for structurally holding the panes in said spaced generally parallel relationship, and the adhesive layer comprising an extruded layer extruded jointly with the extruded plastic body and thereby anchored to it, the method comprising the steps of extruding the plastic untiary structural body and the adhesive layer together with the adhesive layer being pressure extruded jointly with the plastic body, press fitting the rim strip against the edges of the glass panes with the panes in laterally spaced generally parallel relationship, and bringing the adhesive layer into an active adhesive state at or briefly before the rim strip is press fitted against the edges of the glass panes.

8. A method for making a multipane insulating glass according to claim 7 wherein the adhesive layer is a hot sealable adhesive material and is heated to its melting temperature just before being press fitted against the panes.

9. A method for making a multipane insulating glass according to claim 8 wherein the heating is accomplished by hot air and/or supersonic action.

10. A method for making a multipane insulating glass according to claim 8 further comprising the step of preheating the edges of the panes before the rim strip is press fitted thereagainst.

11. A method for making a multipane insulating glass according to claim 7 further comprising the step of preheating parts of the plastic rim strip body to plastically deformable temperature and deforming the preheated parts to press fit them against the glass panes.

12. A method for making a multipane insulating glass according to claim 7 wherein the step of heating and press fitting the rim strip is accomplished progressively and continuously in a longitudinal direction along the rim strip.

13. A method for making a multipane insulating glass according to claim 7 wherein the plastic unitary structural body is extruded to provide longitudinally extending chamber means therein and wherein the method further comprises the steps of inserting moisture absorbent material within the chamber means along the plastic body and, briefly before said step of press fitting the rim strip against the edges of the glass panes, providing openings in the plastic body for interconnecting the moisture absorbent material chamber means with the space between the parallel glass panes.

* * * * *